United States Patent Office 3,824,297
Patented July 16, 1974

3,824,297
METHOD FOR MANUFACTURING A MOLDED ARTICLE OF EXPANDED VERMICULITE
Takeo Wada, Osaka, Japan, assignor to Takeda Chemical Industries, Ltd., Osaka, Japan
No Drawing. Filed Dec. 9, 1971, Ser. No. 206,495
Claims priority, application Japan, Dec. 29, 1970, 46/128,948
The portion of the term of the patent subsequent to Sept. 11, 1990, has been disclaimed
Int. Cl. C04b 2/02, 31/26
U.S. Cl. 264—25                                   5 Claims

ABSTRACT OF THE DISCLOSURE

A new expanded vermiculite molded article is produced by a process which comprises subjecting vermiculite to heating or irradiation with electromagnetic waves in the presence of urea or thiourea and, during or after this process, allowing the vermiculite to contact with formaldehyde.

---

The present invention relates to a method for manufacturing a molded article of expanded vermiculite, which comprises subjecting vermiculite to heating or irradiation with electromagnetic waves in the presence of urea or thiourea and, during or after this process, allowing the vermiculite to contact with formaldehyde.

"Vermiculite" is a generic designation signifying mica-like minerals belonging to the mica group, and contains water of crystallization between its lamellas. Vermiculite has the property to expand when rapidly heated to a temperature beyond a certain critical level, which has been understood to be about 800° C., and thus expanded vermiculite can be used in widely varied industrial applications, such as architectural materials, heat insulators, packing materials, etc. by virtue of its light weight and heat-insulating and sound absorption properties.

The expanded vermiculite is usually obtained in the form of granules, and therefore, when the expanded vermiculite is used in the industrial applications as mentioned above, the granules are necessarily molded into the shape according to the respective objects. For this purpose, it has been proposed that a binding agent such as various synthetic resins (e.g. polyester resins, polyurethane resins, polyvinyl acetate resins, polyvinyl chloride resins, polyacrylic acid resins and so on) is mixed with the expanded vermiculite granules and the mixture is molded into the desired shape.

However, this known method is accompanied with fatal defects in an industrial point of view. Namely, since the expanded vermiculite shows a lamellar structure, most of the binding agent added is consumed in being absorbed into the lamellas without acting as a binding agent, and therefore quite a large amount of the binding agent must be used. Moreover, troublesome procedures are required for mixing the expanded vermiculite granules with a binding agent which is a very viscous material, and even if such procedure is employed, it is hardly possible to obtain a homogeneous mixture, which results in degradation of physical and mechanical properties characterized in the mold article of expanded vermiculite. Furthermore, during the mixing step, there often occurs collapse of the lamellar structure of the expanded vermiculite, which also results in degradation of the properties of the molded article.

Such being the technical state, it has been hitherforce hardly possible to manufacture a molded article of expanded vermiculite having excellent properties by an industrially feasible process step.

Under the circumstances, for the purpose of providing a simple and industrially feasible method for manufacturing a molded article of expanded vermiculite, which has excellent properties, the present inventor has made extensive studies and reached a finding that a molded article of expanded vermiculite can be very easily prepared merely by allowing formaldehyde to contact with expanded vermiculite which is prepared by subjecting vermiculite to heating or irradiation with electromagnetic waves in the presence of urea or thiourea. The present inventor has effected further study to make this finding more particular and concrete, that is, in the expanded vermiculite which is prepared by subjecting vermiculite to heating or irradiation with electromagnetic waves in the presence of urea or thiourea, there remains substantially no urea or thiourea as such but there contain a large number of (about 2 to 3 hundred) products which are produced by decomposition of urea or thiourea; although there are found melamine-like compounds or their intermediates in these decomposing products, clear and concrete chemical identification of all of the respective products is impossible, and it is reasonably assumed that there might contain unknown compound or compounds; when these decomposition products are allowed to contact with formaldehyde, reaction or reactions among them proceed to bind strongly the expanded vermiculite granules with one another, though the mechanism of these reactions is not clarified.

On the other hand, it has been known that urea can be decomposed to give melamine only by contacting with ammonia atmosphere of remarkably elevated pressure in the presence of an acid and that methylol melamines can give cured resinous substances under heating in the presence of an acid.

In view of these chemical knowledges so far known, it is quite unobvious and unexpected that urea would decompose to give many kinds of compounds including melamine-like compounds and their intermediates in vermiculite only by heating or irradiation with electromagnetic wave without addition of ammonia and without high pressure and that thus produced compounds would react with formaldehyde in expanded vermiculite without addition of an acid to such an extent that the expanded vermiculite granules are strongly bound with one another by the act of the reaction products.

The present invention was accomplished on the basis of these unobvious and unexpected findings as mentioned above.

The principal object of the present invention is to provide a simple and industrially feasible method for manufacturing molded articles of expanded vermiculite.

Another object of this invention is to provide molded articles of expanded vermiculite which have excellent and useful properties and can be used in widely varied industrial applications.

The method which can realize the objects of the present invention comprises subjecting vermiculite to heating or irradiation with electromagnetic wave in the presence of urea or thiourea and, during or after this process, allowing the vermiculities to contact with formaldehyde.

The following is detailed explanation of this method.

In accordance with the present invention, the process can be applied to unexpanded vermiculite as well as vermiculite material which is incompletely expanded by such method as rapid heating or the treatment with hydrogen peroxide. Therefore, it is to be noted that the wording "vermiculite" is intended to include unexpanded vermiculite (i.e. vermiculite ore) and incompletely expanded vermiculite throughout the specification and claims.

Furthermore, the starting material of the present invention includes also a pre-treated vermiculite such as cation-exchanged vermiculite (e.g. a dyed vermiculite, $NH_4^+$-exchanged vermiculite, protonated vermiculite, protonated vermiculite, metal cation-exchanged vermiculite such as $Na^+$-exchanged vermiculite, and $Li^+$-exchanged vermiculite, etc.).

The protonated vermiculite is prepared for example by treating naturally occuring vermiculite with a mineral acid (e.g. hydrochloric acid, sulfuric acid, nitric acid, etc.). The metal cation- or $NH_4^+$-exchanged vermiculite is prepared by treating naturally occurring vermiculite with the corresponding ion.

The dyed vermiculite is prepared by per se known methods for example by treating vermiculite or a protonated vermiculite with color-forming cations or the corresponding color-forming molecule, which is capable of forming the color-forming cations with proton. Among the useful color-forming cations are transition metal ions and complex ions of metals with suitable ligands, mordant dyes or organic ammonium ions obtainable by adjusting the pH of dyes having primary to quaternary amino groups, and the like. As said transition metal ions, the ions of metals having atomic numbers from 22 to 29 and from 57 to 71 are usually employed. With regard to said color forming metal complex ions, the combination of any of the metals which can be ions (for example, Fe, Mn, Co, Ni, etc.) with any of such ligands as water, ammonia, cyanide, molecules which are generally used in chelatometry, e.g. ethylenediamine, acetylacetone, pyridine, dipyridyl, 8-oxyquinoline, etc., and mordant dyes exemplified by alizarin, phthalocyanine, 4,4',4''-triaminotriphenylcarbinol, 1,4-diaminoanthraquinone, 4,4'-methylene bis-(2-chloroaniline) or the like. The primary to quaternary amines which can yield color-forming ammonium cations are what are generally known as basic dyes, such as diamines having the aniline srtucture, e.g. phenylenediamine, benzidine, etc., and their derixatives; triphenylmethane type basic dyes having at least one amino group which are examplified by malachite green and fushsin; oxazine type basic dyes; xanthene type basic dyes such as rhodamine; azine dyes such as safranine; aminoanthraquinone dyes; and the like. Those species are employed to modify the color of the product.

As the method for treatment of vermiculite with the ion in order to give dye vermiculite or metal cation- or $NH_4^+$-exchanged vermiculite, any known ion exchange means may be employed to advantage, insofar as the object will not be thwarted. More specifically, use may be made of the method in which the vermiculite is immersed in a solution of a salt of one of said ions in water or organic solvent (for example, acetone, alcohol or benzene) or the method in which said aqueous or organic solvent solution is circulated throughout the vermiculite. As regards the salts of ions mentioned above, the corresponding mineral acid salts such as hydrochloride, sulfate, nitrate, etc. or the corresponding organic acid salts such as acetate, formate, tartarate, oxalate, etc. may be used to advantage.

Thus $Mg^{2+}$ ions in vermiculite is replaced with the cations. While the ion exchange capacity of vermiculite with cations varies with different sources of vermiculite, it is not necessary to effect the replacement to full exchange capacity. The exchange is usually carried out to about 80 to about 200 milliequivalents/100 g. vermiculite. For example, the case of amine dyes having pronounced color-forming properties, sufficiently attractive colors are sometimes obtained when an ion exchange is carried out to $\frac{1}{500}$ of the total ion exchange capacity.

While the size of vermiculite depends upon the use to which the final expanded vermiculite will be put, it is advisable to employ vermiculite in average size of from about 1 to about 10 millimeters, more desirably about 1 to about 8 millimeters in at least two dimensional directions.

Ureau or thiourea or a mixture thereof may be employed in the form of an addition compound of the urea compound with a mineral acid (e.g. phosphoric acid, sulfuric acid, nitric acid, etc.), an organic acid (e.g. acetic acid, tartaric acid, malonic acid, etc.) or the salts of the mineral acid or the organic acid (e.g. calcium nitrate, sodium nitrate, magnesium sulfate, zinc chloride, sodium acetate, etc.) or in the form of an inclusion compound of the urea compound with normal paraffin (e.g. octane, decane, tetradecane, hexadecane, octadecane, etc.), alcohol (e.g. 1-octanol, 1-decanol, 1-hexadecanol, 1-octadecanol, etc.) or carboxylic acid (e.g. caprylic acid, n-capric acid, palmitic acid, stearic acid, etc.).

Practically, in the present method, vermiculite is at first impregnated with the urea compound. The impregnation is usually carried out by adding vermiculite into a melt of the urea compound, immersing vermiculite in a solution of the urea compound in an inert solvent or admixing vermiculite with a suspension or a paste of the urea compound. Such a solvent for the solution, suspension or paste is exemplified by water or an alkanol (e.g. methanol, ethanol or the like). When urea is employed as the urea compound, it is recommended to use urea in the form of a melt, and when thiourea or a mixture of urea and thiourea is employed as the urea compound, the use of a solution, a suspension or a paste thereof is recommended for the better result.

An amount of the urea compound to be impregnated is about 10 to about 200% by weight, more desirably about 50 to about 100% by weight, relative to vermiculite.

In case where the urea compound is employed in the form of a solution, a suspension or a paste, the concentration of the urea compound in the mixture (i.e. solution, suspension or paste) is not critical for the effect of the expansion of vermiculite. But for the purpose of compact procedure and low production cost, the concentration of the urea compound falls in the range from about 10 to about 95 weight percent, preferably about 16.6 to 90 weight percent.

The mere contact of vermiculite with the melt or the mixture of the urea compound immediately causes impregnation of vermiculite with the urea compound to give a composition of vermiculite and the urea compound.

It may be possible to add an oxy acid salt, a mineral acid or an organic acid to vermiculite for the better result. The oxy acid salt includes oxy acid salts of Mg, Ca, Sr, Ba, etc., the mineral acid includes hydrochloric acid, sulfuric acid, phosphoric acid, etc., and the organic acid includes acetic acid, tartaric acid, etc. An amount of the acid salt or acid to be added is about 0 to about 0.2 mol/ 100 g. vermiculite. The addition is conducted at the same time with or after the treatment with the urea compound.

Thus treated vermiculite is then expanded. The expansion is attained by heating the vermiculite at a temperature of about 160 to about 500° C., most desirably around 220° C., for about 10 minutes to about 1 hour, or by irradiating the vermiculite with electromagnetic wave.

The electromagnetic waves to be employed according to this invention is usually a microwave or far infrared radiation and the frequency range that is useful is generally about 1 megacycle per second to about 10,000 kilomegacycles per second, more preferably about 10 to about 10,000 megacycles per second. The expression "mHz" has the same meaning as the expression "megacycles per second" and the former expression may be used instead of the latter.

The duration of irradiation usually ranges from about 0.0001 to about 30 minutes, though the proper time depends upon such factors as the frequency of the electromagnetic wave selected, the type and grain size of vermiculite to be irradiated, and the like.

The electromagnetic wave is supplied by any of per se known electromagnetic sources, e.g. an electronic range, high frequency welder or the like. The necessary power of the electromagnetic wave for the purpose should vary with other conditions such as the type, volume and grain size of vermiculite and the intended expansion degree.

But it is usually in the range from about $10^{-6}$ kilowatt hour to about 1 kilowatt hour per gram of vermiculite.

The reaction vessel may be any kind of container if only it is made of a material which is resistant to microwave or far infrared radiation and which features a low induction loss. More specifically, vessels made of polyethylene resin, various types of glass, silicon, phenolic resin, polyester resin, epoxy resin and nylon may be mentioned by way of example.

The above mentioned expansion of vermiculite may be conducted under elevated pressure such as 1 to 50 kg./cm.$^2$.

According ao the present method, formaldehyde is allowed to contact with vermiculite during or after the above-mentioned expansion stage. Namely, after the above expansion process is over, the resulting expanded vermiculite is allowed to contact with formaldehyde, or alternatively, vermiculite impregnated with the urea compound is allowed to contact with formaldehyde under heating or irradiating with electromagnetic wave under the conditions as mentioned above.

The "formaldehyde" throughout the present specification and claims includes not only formaldehyde per se but also its chemical equivalents such as paraformaldehyde.

The contact with formaldehyde may be conducted by any of techniques which can attain the object, for example, by spraying an aqueous formaldehyde solution throughout the vermiculite, by immersing the vermiculite in an aqueous formaldehyde solution, or by blowing gaseous formaldehyde over the vermiculite. The contact is generally conducted at room temperature under normal pressure, but if desired, may be conducted under heating or cooling and/or under elevated pressure.

An amount of formaldehyde to be used is about 0.5 to about 3.3 mol/mol of urea compound.

The above process steps are preferably conducted using a mold corresponding to the desired shape.

Thus, the expanded vermiculite granules are bound strongly with one another by the act of the resulting product of formaldehyde and the decomposing materials of the urea compound, whereby there is manufactured a molded article of expanded vermiculite. For the better result, after the contact with formaldehyde is completed, the resultant may be further heated or irradiated with electromagnetic waves under similar conditions to those as mentioned in the step for expansion of vermiculite, preferably in the presence of an alkaline substance such as alkali metal hydroxides (e.g. sodium hydroxide, potassium hydroxide) and alkaline earth metal hydroxides (e.g. magnesium hydroxide, calcium hydroxide, barium hydroxide). An amount of the alkaline substance to be used is about 0 to about 10 weight percent relative to the urea compound.

In the production of the molded article of this invention, there may be incorporated into the vermiculite reinforcing materials such as rock wools, glass wools, glass fibers, asbestos, celluloses, wire-nettings, and the like, fillers such as clays, calcium carbonate, and the like, releasing agents such as zinc stearate, carbon black, titan white, chrome yellow, pigments, and other additives.

The shape of the molded article of this invention may be any of conventional ones such as sheet, board, pillar, block, tile, pile, etc. and the shape corresponding to the respective goods.

According to the present invention, molded article of expanded vermiculite can very easily be manufactured by quite a simple process step. The molded article of expanded vermiculite, which is prepared by the present method, retains excellent and interesting properties which are characterized in expanded vermiculite itself, such as light weight, sound absorption, heat insulation, ion exchangeability, humidity control property, water holding capacity, odor eliminating property, particularly ammoniacal odor eliminating property, attractive appearance, etc. Furthermore, among the above-mentioned excellent properties possessed by the article of the present invention, ion exchangeability, humidity control property, high water holding capacity and odor eliminating property are hardly observed in a molded article of expanded vermiculite which is prepared by expansion after a conventional manner, i.e. rapid heating at not lower than about 800° C., but are peculiar to the molded article of the present invention which is prepared by combination of "expansion by heating at rather low temperature or by irradiation with electromagnetic waves, in the presence of urea or thiourea" with "contact with formaldehyde."

Taking advantage of these excellent properties, the molded article of the present invention can be used in widely varied industrial applications such as architectural materials (e.g. floor boards, ceillings, wainscots, etc.), heat insulators, packing materials, etc. For instance, vermiculite is expanded and molded into sheets by the present method, the sheets are cut into a proper length and width, and thus shaped sheets are applied on floor, ceilling, wall, etc. after a conventional manner.

Following are illustrative examples of this invention, in which the term "part(s)" means "weight part(s)" unless otherwise noted and relationship between "weight part" and "volume part" is the same as that between "gram" and "milliliter."

Example 1

A mixture of 300 parts of vermiculite (about 3 millimeters square; sold by Parabora Mining Co., South Africa Republic), 90 parts of urea and 75 volume parts of water is charged in a glass vessel fitted with a lid. The vessel is placed in a 500 watt electronic range of 2450 MHz (manufactured by Matsushita Electric Company, Ltd. in Japan; NE 5500). After 10 minutes irradiation, the vermiculite is expanded to about 3000 volume parts.

Over thus expanded vermiculite is sprayed a mixture of 110 volume parts of 38% aqueous formaldehyde solution and 3 parts of $Ba(OH)_2 \cdot 8H_2O$ dissolved therein. After 2 hours, the vermiculite material is kept at about 25° C. overnight. The material is then packed into a mold (50 cm. by 50 cm. x 0.5 cm. thick), followed by heating at 150° C. for 15 minutes under pressure of 50 kg./2500 cm.$^2$.

This procedure gives a board of expanded vermiculite which has a bulk density of 0.25. A test piece (5 cm. by 5 cm. x 0.5 cm. thick) of the board does not collapse nor sodden even after immersion into water for 1 week.

Example 2

A molding frame of silicone rubber, 35 cm. by 50 cm. x 3 mm. thick, is positioned on the lower electrode of a welder (electrode dimensions; about 40 cm. x 60 cm., 2.5 kilowatt, 4068 mHz, manufactured by Fuji Dempa Koki Kabushiki Kaisha in Japan).

On the other hand, 10 parts of the same vermiculite as in Example 1 is added to 100 volume parts of 1 N aqueous cobalt (II) nitrate solution and the mixture is heated at 80° C. for 5 hours. The resultant is filtered under heating, followed by washing with water.

This procedure gives $Co^{2+}$-exchanged vermiculite wherein 12 meq. of $Mg^{2+}$ in 100 gram vermiculite is ion-exchanged by $Co^{2+}$.

A mixture of 100 parts of the above-prepared $Co^{2+}$-exchanged vermiculite, 50 parts of urea and 30 volume parts of water is charged into the afore-mentioned molding frame, and irradiated with electromagnetic waves for about 25 minutes by means of the welder, whereby the vermiculite is expanded to the capacity of the frame. After the supply of the wave is suspended, a mixture of 54 volume parts of 38% aqueous formaldehyde solution and 1 part of $Ba(OH)_2 \cdot 8H_2O$ dissolved therein is introduced into the frame through the four apertures in the upper electrode. After standing for 30 minutes, carbon dioxide gas is introduced through the apertures, followed by keeping standing for another 30 minutes. Then, the irradiation of the electromagnetic waves is conducted again for 15 minutes.

This procedure gives violet-colored board measuring 35 x 50 x 0.3 cm. The board has bulk density of 0.30 and does not collapse nor sodden even after immersion in water for 48 hours.

Example 3

300 Parts of hydrobiotite (produced in Ono-hin-machi, Fukushima, Japan), 150 parts of urea and 80 volume parts of water are mixed with one another. The mixture is charged in a vessel with a lid and heated at 220° C. for 5 to 10 minutes, whereby the hydrobiotite is expanded to 2.1000 volume parts.

A mixture of 200 volume parts of 38 percent aqueous formaldehyde solution and 6 parts of $Ba(OH)_2 \cdot 8H_2O$ dissolved therein is sprayed over the expanded hydrobiotite, followed by keeping standing at 30° C. overnight. The resultant is put itno the same mold as in Example 1 and heated at 150° C. under pressure of 20 kg./cm.² for about 20 minutes.

This procedure gives a molded board having a bulk density of 0.25.

Example 4

Into 534 volume parts of 37.4 percent aqueous formaldehyde solution is dissolved 8 parts of $Ba(OH)_2 \cdot 8H_2O$, and then added 200 parts of urea, followed by keeping at 28 to 30° C. for 15 minutes.

500 parts of vermiculite (the same as in Example 1) is added to the above prepared solution, followed by keeping standing for 12 hours.

The mixture is charged into a vessel made of glass and irradiated with electromagnetic wave (2450 mHz; 500 watt) for 5 minutes. The resulting expanded vermiculite is put into the same mold as in Example 1 and heated at 150° C. under pressure of 30 kg./cm.² for 10 minutes. This procedure gives molded board having a bulk density of 0.20.

What is claimed is:

1. A process for manufacturing a molded article of expanded vermiculite in a mold corresponding to the desired shape which comprises:
   (1) filling said mold with a mixture of unexpanded or incompletely expanded vermiculite and urea or thiourea;
   (2) subjecting said mixture to heating at about 160° C. to about 500° C. for about 10 minutes to about 1 hours or to irradiation with electromagnetic waves in the range of from about 1 megacycle per second to about 10,000 kilomegacycles per second; and
   (3) during or after this process spraying the vermiculite with an aqueous formaldehyde solution or immersing the vermiculite in an aqueous formaldehyde solution or blowing gaseous formaldehyde over the vermiculite, the amount of urea or thiourea being about 10 to about 200% by weight relative to the vermiculite and the amount of formaldehyde being about 0.5 to about 3.3 mol/mol of the urea or thiourea.

2. A method as claimed in claim 1, wherein (1) vermiculite is impregnated with urea or thiourea, (2) the thus treated vermiculite is heated or irradiated with electromagnetic waves, and (3), during or after the process (2), the vermiculite is allowed to contact with formaldehyde.

3. A method as claimed in claim 1 wherein vermiculite is impregnated with urea or thiourea, the thus impregnated vermiculite is heated or irradiated with electromagnetic waves, and then the thus treated vermiculite is allowed to contact with formaldehyde.

4. A method as claimed in claim 1, wherein vermiculite is impregnated with urea or thiourea and the impregnated vermiculite is heated or irradiated with electromagnetic waves under contacting with formaldehyde.

5. A method as claimed in claim 1, wherein an amount of urea or thiourea is 50 to 200 weight percent relative to vermiculite.

References Cited

UNITED STATES PATENTS

| | | | |
|---|---|---|---|
| 2,057,672 | 10/1936 | Ellis | 106—Dig. 003 |
| 1,972,390 | 9/1934 | Miner | 108—86 |
| 3,619,435 | 11/1971 | Kepper | 106—40 |

FOREIGN PATENTS

| | | | |
|---|---|---|---|
| 1,167,798 | 10/1969 | Great Britain | 252—378 R |

PATRICK P. GARVIN, Primary Examiner

P. E. KONOPKA, Assistant Examiner

U.S. Cl. X.R.

106—38.2, Dig. 0.003; 204—157.1 R; 252—378 R; 260—39 S; 264—22, 110; 161—168, 206